(12) United States Patent
Johnson et al.

(10) Patent No.: US 10,539,285 B1
(45) Date of Patent: Jan. 21, 2020

(54) VEHICLE LIGHTING ASSEMBLY

(71) Applicant: Ford Global Technologies, LLC, Dearborn, MI (US)

(72) Inventors: Aaron Bradley Johnson, Wayne, MI (US); Paul Kenneth Dellock, Northville, MI (US); Stephen Kenneth Helwig, Farmington Hills, MI (US); Stuart C. Salter, White Lake, MI (US); Jeffrey Alan Mesko, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 16/050,773

(22) Filed: Jul. 31, 2018

(51) Int. Cl.
*F21S 41/24* (2018.01)
*G02B 6/122* (2006.01)
*F21S 41/16* (2018.01)
*F21S 41/25* (2018.01)
*G02B 5/02* (2006.01)

(52) U.S. Cl.
CPC ............... *F21S 41/24* (2018.01); *F21S 41/16* (2018.01); *F21S 41/25* (2018.01); *G02B 5/02* (2013.01); *G02B 6/122* (2013.01)

(58) Field of Classification Search
CPC . F21S 41/24; F21S 41/25; F21S 41/16; G02B 5/02; G02B 6/122; B60Q 1/323
See application file for complete search history.

(56) References Cited

U.S. PATENT DOCUMENTS

| | | | | |
|---|---|---|---|---|
| 6,139,176 A * | 10/2000 | Hulse | .................... | G02B 6/0005 362/277 |
| 6,250,785 B1 * | 6/2001 | Mallia | .................... | B60Q 1/323 362/495 |
| 7,556,412 B2 | 7/2009 | Guillermo | | |
| 9,783,100 B2 * | 10/2017 | Salter | ................. | H05B 33/0845 |
| 2008/0025039 A1 * | 1/2008 | Guillermo | .............. | A42B 3/044 362/556 |
| 2009/0296018 A1 * | 12/2009 | Harle | .................... | G01M 11/062 349/61 |
| 2013/0229820 A1 * | 9/2013 | Jutila | ..................... | B60Q 1/323 362/545 |
| 2015/0184823 A1 * | 7/2015 | Ladenburger | .......... | G02B 6/005 362/511 |
| 2016/0070048 A1 | 3/2016 | Dietrich | | |
| 2017/0072841 A1 * | 3/2017 | Schabacker | .......... | B60Q 1/2696 |
| 2019/0031090 A1 * | 1/2019 | Stossel | .................... | B60R 13/02 |

FOREIGN PATENT DOCUMENTS

| | | |
|---|---|---|
| DE | 202008011063 U1 | 2/2010 |
| DE | 102010007848 A1 | 9/2010 |

OTHER PUBLICATIONS

"Automotive Exterior Lighting" SCHOTT AG, http://www.schott.com/lightingimaging/english/automotive/applications/exteriorlighting.html.

\* cited by examiner

Primary Examiner — Mary Ellen Bowman
(74) Attorney, Agent, or Firm — Vichit Chea; Price Heneveld LLP

(57) ABSTRACT

A running board top plate is provided that comprises a plurality of light-diffusing waveguides, a reflective layer positioned around a portion of each light-diffusing waveguide, a base layer configured to receive one or more of the light-diffusing waveguides and the reflective layer, and a clear lens layer positioned over the light-diffusing waveguides, the reflective layer, and the base layer.

20 Claims, 7 Drawing Sheets

VEHICLE LIGHTING ASSEMBLY

FIELD OF THE DISCLOSURE

The present disclosure generally relates to a lighting assembly, and more specifically to a lighting assembly for a vehicle.

BACKGROUND OF THE DISCLOSURE

Many conventional vehicles have some signature or ambient lighting on the exterior of the vehicle. However, as more lighting features are desired by users, it is therefore desirable to add additional lighting assemblies to vehicle exteriors.

SUMMARY OF THE DISCLOSURE

According to some aspects of the present disclosure, a running board for a vehicle is provided that comprises a bottom plate operably coupled to a top plate. Each of the bottom plate and the top plate include a base layer. The running board further comprises a plurality of lighting assemblies coupled to the base layer of one of the top plate and the bottom plate. Each of the plurality of lighting assemblies comprises a reflective layer defining a channel and a light-diffusing waveguide positioned within the channel. The light-diffusing waveguide has a plurality of scattering sites. The running board further comprises a lighting module optically coupled to each of the plurality lighting assemblies. Each of the lighting modules includes a laser diode.

Embodiments of this aspect of the disclosure can include any one or a combination of the following features:
- a portion of the plurality of lighting assemblies is positioned across the base layer of the top plate;
- a portion of the plurality of lighting assemblies is positioned on the base layer of the bottom plate;
- the running board top plate and the running board bottom plate are movable between first and second positions, and further wherein the lighting assemblies are configured to emit light in both the first and second positions; and/or
- the plurality of lighting assemblies is in a first state when the top plate and the bottom plate are in the first position, and further wherein the plurality of lighting assemblies is in a second state when the top plate and the bottom plate are in the second position.

According to other aspects of the present disclosure, a running board top plate is provided that comprises a plurality of light-diffusing waveguides, a reflective layer positioned around a portion of each light-diffusing waveguide, a base layer configured to receive one or more of the light-diffusing waveguides and the reflective layer, and a clear lens layer positioned over the light-diffusing waveguides, the reflective layer, and the base layer.

Embodiments of this aspect of the disclosure can include any one or a combination of the following features:
- the base layer comprises fiber-filled polypropylene;
- the reflective layer comprises polypropylene and extends about 180 degrees around each of the light-diffusing waveguides;
- the polypropylene includes a pigment with a refractive index of approximately 2.0 to approximately 2.6;
- each of the reflective layers defines a channel and further wherein one of the plurality of light-diffusing waveguides is positioned within each of the channels;
- the lens layer comprises clarified polypropylene;
- a first end of each of the plurality of light-diffusing waveguides is optically coupled with a lighting module having a laser diode;
- the laser diode is one of a single-color laser diode and an RGB laser diode;
- the lighting module is configured to produce one of a plurality of colors of light based on movement of the vehicle;
- the lighting module is configured to produce one of a plurality of colors of light based on user input; and/or
- each of the plurality of light-diffusing waveguides is a light-diffusing fiber, and further wherein each fiber has a plurality of scattering sites.

According to other aspects of the present disclosure, a method of manufacturing a running board is provided that comprises the steps of extruding a base layer of a lighting assembly, extruding a clear lens layer of the lighting assembly, and extruding a light-diffusing fiber into a reflective layer of the lighting assembly. The base layer forms a portion of the running board. the clear lens layer comprises clarified polypropylene. The light-diffusing fiber includes a plurality of scattering sites.

Embodiments of this aspect of the disclosure can include any one or a combination of the following features:
- the steps of extruding a base layer of a lighting assembly, extruding a clear lens layer of the lighting assembly, and extruding a light-diffusing fiber into a reflective layer of the lighting assembly and the base layer are performed substantially simultaneously;
- the method further comprises the step of positioning a lighting module at a first end of the lighting assembly, wherein the lighting module includes one of a single-color laser diode and an RGB laser diode; and/or
- the reflective layer has a refractive index from about 2.0 to about 2.6.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
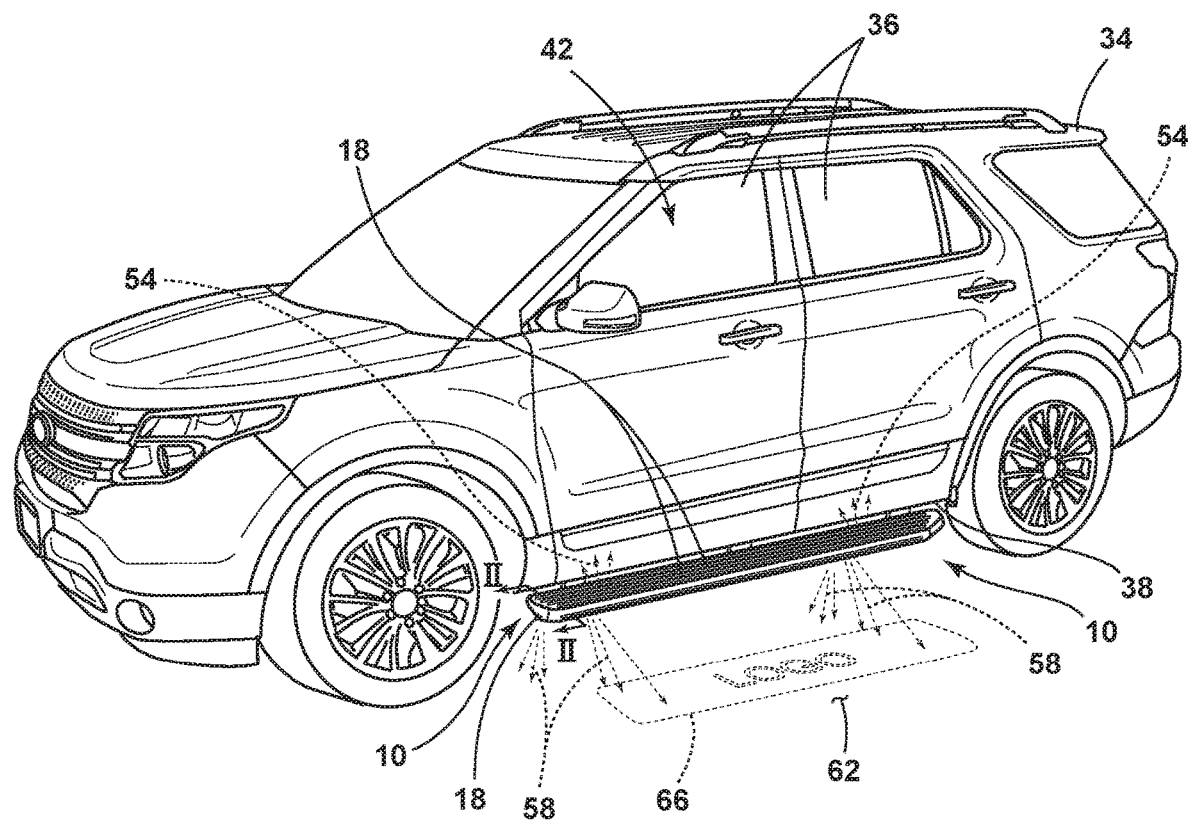
FIG. 1 is a perspective view of a vehicle having a plurality of lighting assemblies disposed within a running board.
Figure 2:
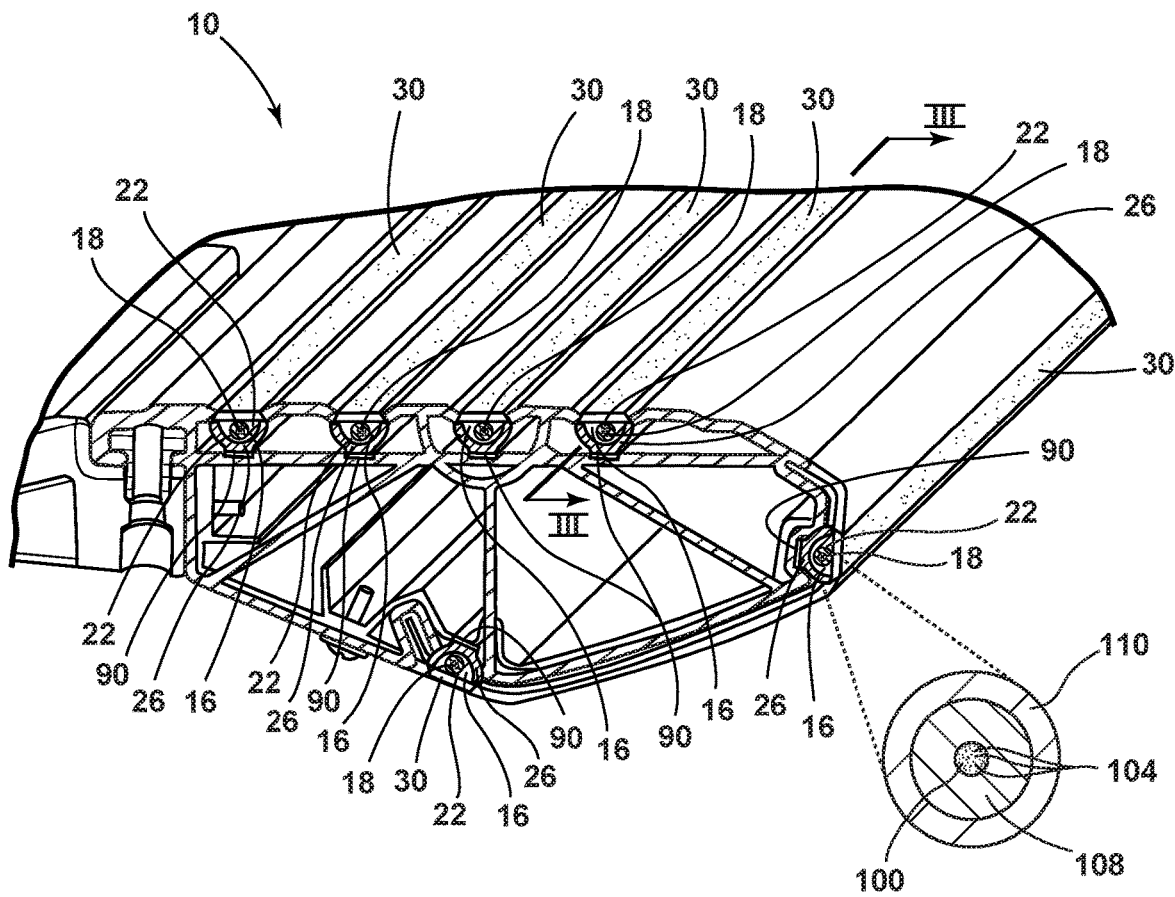
FIG. 2 is a cross-sectional front perspective view taken along line II-II of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a running board having a plurality of lighting assemblies. The lighting assemblies may be positioned around the running board to serve a variety of functions. According to various examples, the plurality of lighting assemblies may be configured to light a top plate of the running board. In other examples, some of the plurality of lighting assemblies may be configured to serve as puddle lamps or as a welcome indicator. The plurality of lighting assemblies may illuminate in a variety of colors to indicate certain states of the vehicle or the key fob, providing a user with information as the user approaches or providing a pleasing aesthetic to the user. Where the running board is retractable, the plurality of lighting assemblies may be illuminated when the running board is retracted or extended to provide a user with a larger range of options for lighting.

Referring now to FIGS. 1-5, reference numeral 10 generally denotes a running board having a top plate 14 and a lighting assembly 16. Each lighting assembly 16 includes a plurality of light-diffusing waveguides 18, a reflective layer 22 positioned around a portion of each light-diffusing waveguide 18, a base layer 26 configured to receive one or more of the light-diffusing waveguides 18 and the reflective layer 22, and a clear lens layer 30 positioned over the light-diffusing waveguides 18, the reflective layer 22, and the base layer 26.

Referring now to FIG. 1, the running board 10 is positioned on a vehicle 34 and is coupled to a frame 38 of the vehicle 34 for providing an occupant egress assistance for entering and exiting the passenger compartment 42 of the vehicle 34. In the depicted example, the running board 10 is positioned on the side of the vehicle 34 beneath vehicle doors 36. In other examples, the running board 10 may be positioned on the rear of the vehicle 34. In the depicted example, the running board 10 is a single continuous running board 10. In other examples, the running board 10 may include a plurality of smaller running boards 10 configured to be separately operable.

Referring now to FIGS. 2-4B, the running board 10 includes the top plate 14 coupled to a bottom plate 80. The top plate 14 may be directly coupled with the bottom plate 80, or the top plate 14 and the bottom plate 80 may be coupled to first and second lateral walls 84, 86 extending between the top plate 14 and the bottom plate 80. Each of the top plate 14, the bottom plate 80, the first lateral wall 84, and the second lateral wall 86 may be formed of fiber-filled polypropylene material. According to various examples, the material may be 30% glass fiber-filled polypropylene copolymer. In other examples, the glass fiber volume fraction may be from about 1% and about 60%, or from about 15% to about 40%, or from about 30% to about 40%. It is contemplated that any other fiber may be used, including, for example, carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

Each end of the running board 10 may be equipped with an end cap 88 configured to protect the interior of the running board 10. Each end cap 88 may be formed of a polymer including, for example, polypropylene, polyethylene, polystyrene, polyvinyl chloride, etc. Each end cap 88 may be configured to fit over the edges of the top plate 14, the bottom plate 80, the first lateral wall 84, and the second lateral wall 86. The end caps 88 are configured to prevent exterior elements (e.g., dirt, water, etc.) from entering an interior space 118 defined by the running board 10. According to various examples, the end caps 88 may be fixedly coupled to the running board 10. In other examples, the end caps 88 may be removable, exposing the interior of the running board 10 when the end cap 88 is not coupled to the running board 10. In still other examples, the end cap 88 may be integrally formed with any one or combination of the top plate 14, the bottom plate 80, the first lateral wall 84, and the second lateral wall 86.

The running board 10 may further include the plurality of lighting assemblies 16 positioned on various parts of the running board 10. The running board 10 may define a plurality of channels 90 configured to receive a plurality of lighting assemblies 16. According to various examples, each of the plurality of channels 90 may have a generally semi-circular cross-sectional shape. However, it will be understood that each of the plurality of channels 90 may have any cross-sectional shape conducive to receiving the respective lighting assembly 16 including, for example, square, rectangular, triangular, trapezoid, etc. Each of the lighting assemblies 16 is received within the respective channel 90 and positioned to illuminate inwardly and outwardly of the channel 90, as discussed elsewhere herein.

Each of the plurality of channels 90 may be defined by any one of the top plate 14, the bottom plate 80, the first lateral wall 84, the second lateral wall 86, or any combination of those to serve various lighting functions. In the depicted example, as shown in FIG. 1, each of the plurality of lighting assemblies 16 extend along the entirety of the top plate 14, bottom plate 80, first later wall 84, or second lateral wall 86 of the running board 10. In other examples, the lighting assemblies 16 may extend only partially along the top plate 14. In still other examples, multiple lighting assemblies 16 may be positioned within each channel 90 to provide a wave-like lighting pattern from one end of the channel 90 to the other. The multiple lighting assemblies 16 may be used to create a dashed pattern, a dotted pattern, a fluctuating pattern, etc. It is also contemplated that some portions of the channel 90 may be void without any lighting assembly 16 positioned therein. It will be understood that any number of the plurality of lighting assemblies 16 may be of varying lengths and sizes and positioned in various portions of the channels 90 to provide various illumination patterns along the running board 10 without departing from the scope of the present disclosure.

Each of the lighting assemblies 16 includes the light-diffusing waveguide 18, the reflective layer 22, the base layer 26, and the clear lens layer 30. According to various examples, the portion of the running board 10 defining the respective channel 90 may function as the base layer 26 for each of the plurality of lighting assemblies 16. In other examples, the base layer 26 may be a separate structure from the running board 10 and may be received within the channel 90 with the reflective layer 22 and the light-diffusing waveguide 18.

According to various examples, the reflective layer 22 is positioned to extend about 180 degrees around a portion of the light-diffusing waveguide 18 such that the portion of the light-diffusing waveguide 18 not surrounded by the reflective layer 22 is positioned to emit light 54, 58 outward of the respective channel 90. In other examples, the reflective layer 22 may extend from about 10 degrees to about 180 degrees, or from about 20 degrees to 170 degrees, from about 30 degrees to about 160 degrees, from about 40 degrees to about 150 degrees, from about 50 degrees to about 140 degrees, from about 60 degrees to about 130 degrees, from about 70 degrees to about 120 degrees, from about 80 degrees to about 110 degrees, from about 90 degrees to about 100 degrees, or any and all values and ranges therebetween.

The reflective layer 22 may be extruded with the light-diffusing waveguide 18. The reflective layer 22 is formed of a white-colored polypropylene to reflect emitted light 54, 58 upward from the light-diffusing waveguide 18. The pigment to give the polypropylene the white color may have a refractive index of about 1.8, or about 1.9, or about 2.0, or about 2.1, or about 2.2, or about 2.3, or about 2.4, or about 2.5, or about 2.6, or about 2.7, or about 2.8, or any and all values and ranges therebetween. For example, the pigment may have a refractive index from approximately 2.0 to approximately 2.6. According to various examples, titanium dioxide or boron nitride may be used as a colorant to produce the white color. It will be understood that any pigment or colorant having the refractive index as described may be used to produce the white color of the reflective layer 22.

The light-diffusing waveguide 18 may be insert extruded with the reflective layer 22 and the clear lens layer 30. Each light-diffusing waveguide 18 includes a core 100 having a plurality of scattering sites 104. The core 100 may be encased in cladding 108. Both of the core 100 and the cladding 108 may be formed of glass or fiberglass. According to various examples, the core 100 and the cladding 108 may be surrounded by sleeve 110 formed of polyvinyl chloride or vinyl to shield the core 100 and cladding 108 from exterior elements. The plurality of scattering sites 104 within the core 100 allows the light-diffusing waveguide 18 to evenly disperse emitted light 54, 58 across the entirety of the light-diffusing waveguide 18.

According to various examples, the light-diffusing waveguide 18 may be a light-diffusing optical wire or a fiber optic cable. The use of an optical wire or fiber as the light-diffusing waveguide 18 allows the light to be carried over long distances (e.g., the entirety of the running board 10). The optical wire or fiber used in each of the lighting assemblies 16 employs the plurality of scattering sites 104 within the core 100 of the fiber to provide efficient scattering of emitted light 54, 58 through all sides of the optical fiber. A single light-diffusing waveguide 18 or multiple light-diffusing waveguides 18 may be extruded with the reflective layer 22.

The clear lens layer 30 is positioned over the channel 90 to cover each lighting assembly 16. Because conventional materials for the clear lens layer 30 include glass or acrylic, it may be difficult to couple the clear lens layer 30 with the reflective layer 22 and the base layer 26. This may allow exterior elements (e.g., dirt, water, insects, etc.) to enter the channel 90 through gaps and seams and damage or obscure the light produced by the lighting assembly 16. To prevent the entrance of the exterior elements into the channel 90 and/or lighting assembly 16, according to various examples, the clear lens layer 30 may be extruded simultaneously with the reflective layer 22 and the base layer 26. The clear lens layer 30 may be formed of clarified polypropylene using clarifying agents such as Millad® NX' 8000 to allow the polypropylene to approach the clarity of glass while still being compatible with tri-extruding the lighting assembly 16. The clarified polypropylene produces the clear lens layer 30 without the gaps and seams by allowing the reflective layer 22, the base layer 26, and the clear lens layer 30 to be a continuous polymeric structure. In other words, the reflective layer 22, the base layer 26, and the clear lens layer 30 are integrally formed. Such a feature may be advantageous in preventing contaminants from entering the running board 10.

Figure 3:
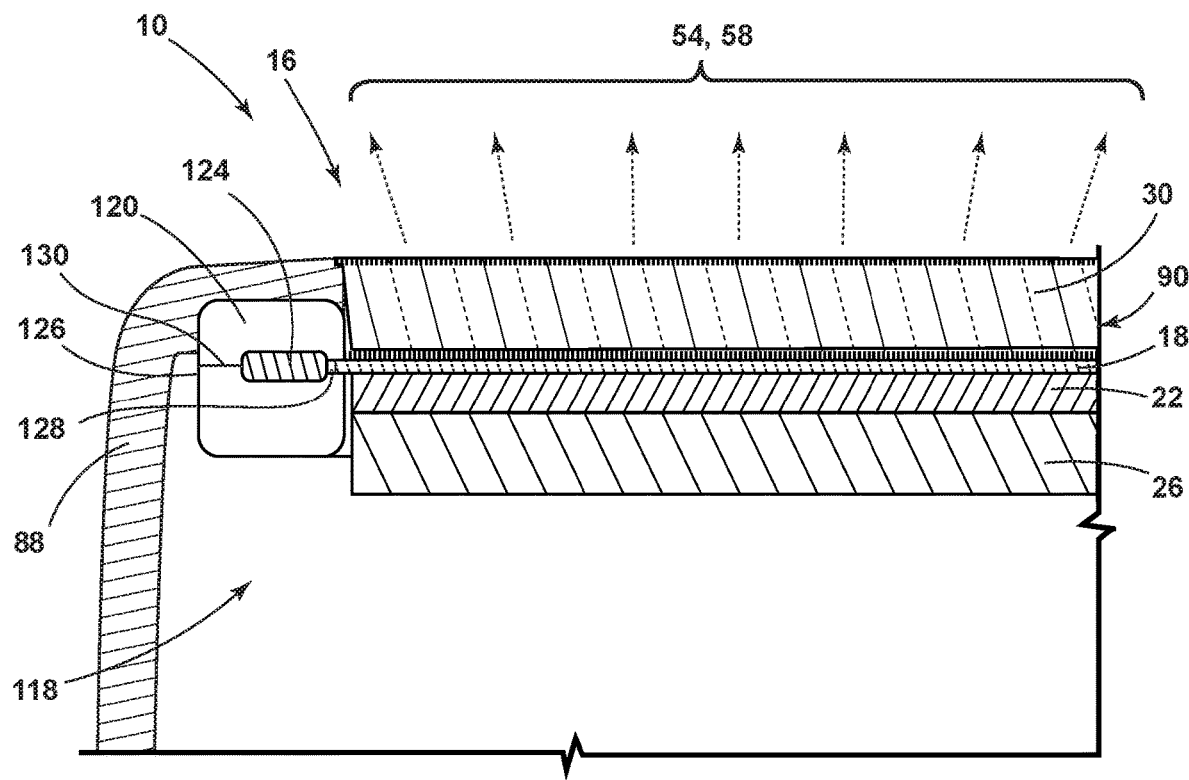
FIG. 3 is a cross-sectional view taken along line of FIG. 2.

Further, each of the plurality of lighting assemblies 16 includes at least one lighting module 120 having a laser diode 124. The lighting module 120 includes a housing 126 configured to encase the laser diode 124 and an optional lens 128. According to various examples, as shown in FIG. 3, the lighting assembly 16 includes the single lighting module 120 positioned on an end of the lighting assembly 16. In other examples, lighting modules 120 may be positioned at both ends of the light-diffusing waveguide 18.

The housing 126 is generally cubical in the depicted example. However, it will be understood that the housing 126 may be any shape configured to house the laser diode 124 and configured to be optically coupled to one of the light-diffusing waveguides 18. The housing 126 may be configured to host a single laser diode, as shown in the depicted example. However, it is contemplated that the housing 126 may house multiple laser diodes 124. Each laser diode 124 may be optically coupled to one of the plurality of lighting assemblies 16 to provide a single lighting module 120 for the entirety or a portion of the plurality of lighting assemblies 16.

Figure 5:
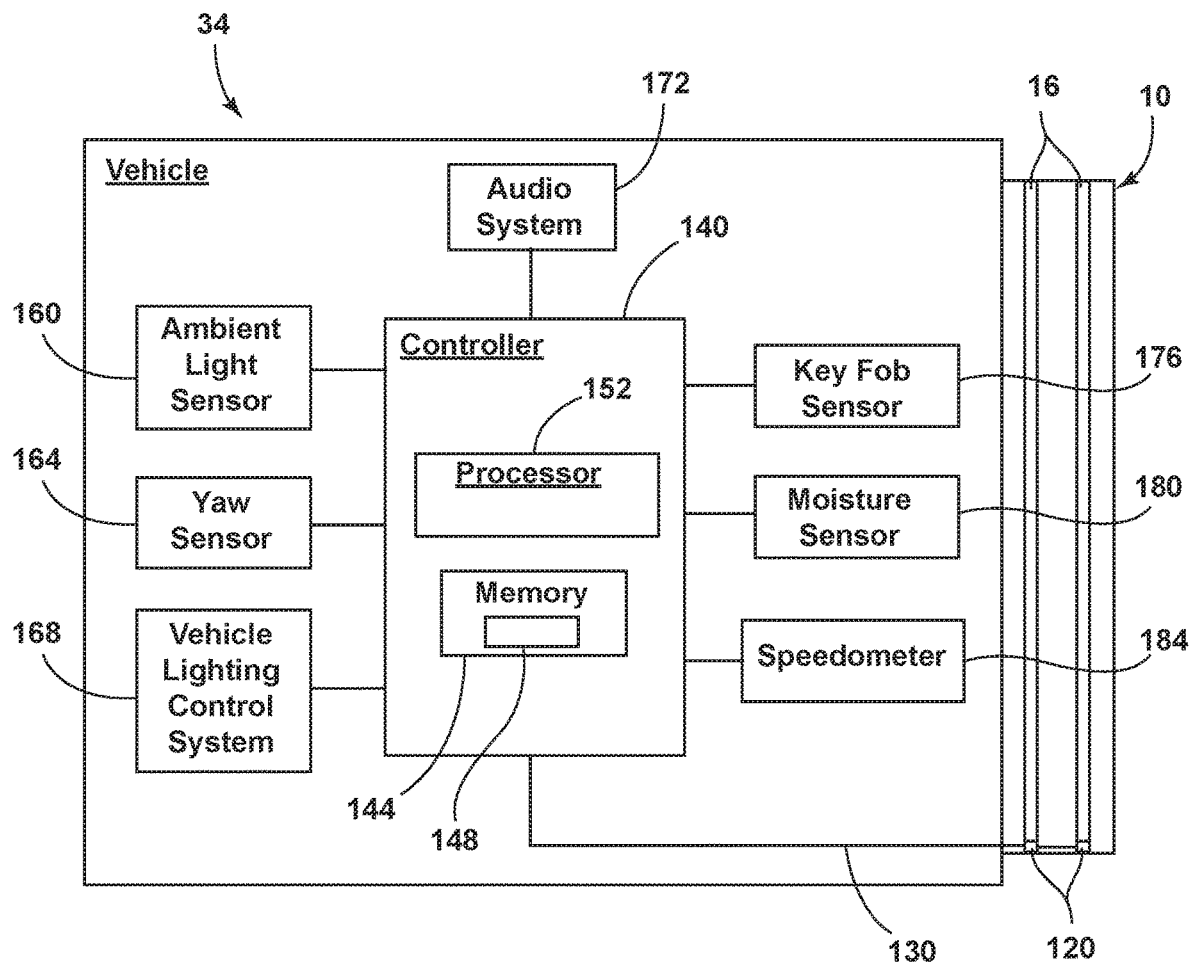
FIG. 5 is a schematic view of the vehicle of FIG. 1.

In various examples, the housing 126 may be formed of a metal alloy. In other examples, the housing 126 may be formed of a polymer. The light-diffusing waveguide 18 is operably coupled with the housing 126 and the laser diode 124 and may be at least partially received by the housing 126. According to various examples, the lighting module 120 may include the optic lens 128 coupled between each of the laser diodes 124 and the respective light-diffusing waveguide 18. The lens 128 may be configured to focus light from the laser diode 124 toward the light-diffusing waveguide 18. Wiring leads 130 may also be housed within the housing 126, and the wiring leads 130 may be configured to connect the laser diode 124 to a controller 140 (FIG. 5).

The laser diode 124 of the lighting module 120 may be a single color laser diode or a red-green-blue (RGB) laser diode and may be configured to push light through the light-diffusing waveguide 18 to produce the emitted light 54, 58. According to various examples, where RGB laser diodes are used, the vehicle user can select the color of the emitted light 54, 58. In other examples, where RGB laser diodes are used, various sensors of the vehicle 34 can determine the color of emitted light 54, 58 (FIG. 5) based on operating conditions of the vehicle 34.

The emitted light 54, 58 produced by the light-diffusing waveguide 18 is directed outward of the running board 10. The emitted light 54, 58 may illuminate the exterior of the vehicle 34 and/or may function as a position lamp to detail the location of the running board 10. Some emitted light 54 may be directed in a first direction from the running board 10 while some emitted light 58 may be directed in a second direction from the running board 10. Emitted light 58 directed in the second direction is generally toward a ground surface 62 and may be configured to illuminate in a lighting pattern 66. In various examples, the lighting pattern 66 may include a logo or any other indicia (FIG. 1). In other examples, the lighting pattern 66 may be a puddle of light or any other lighting pattern.

Figure 4A:
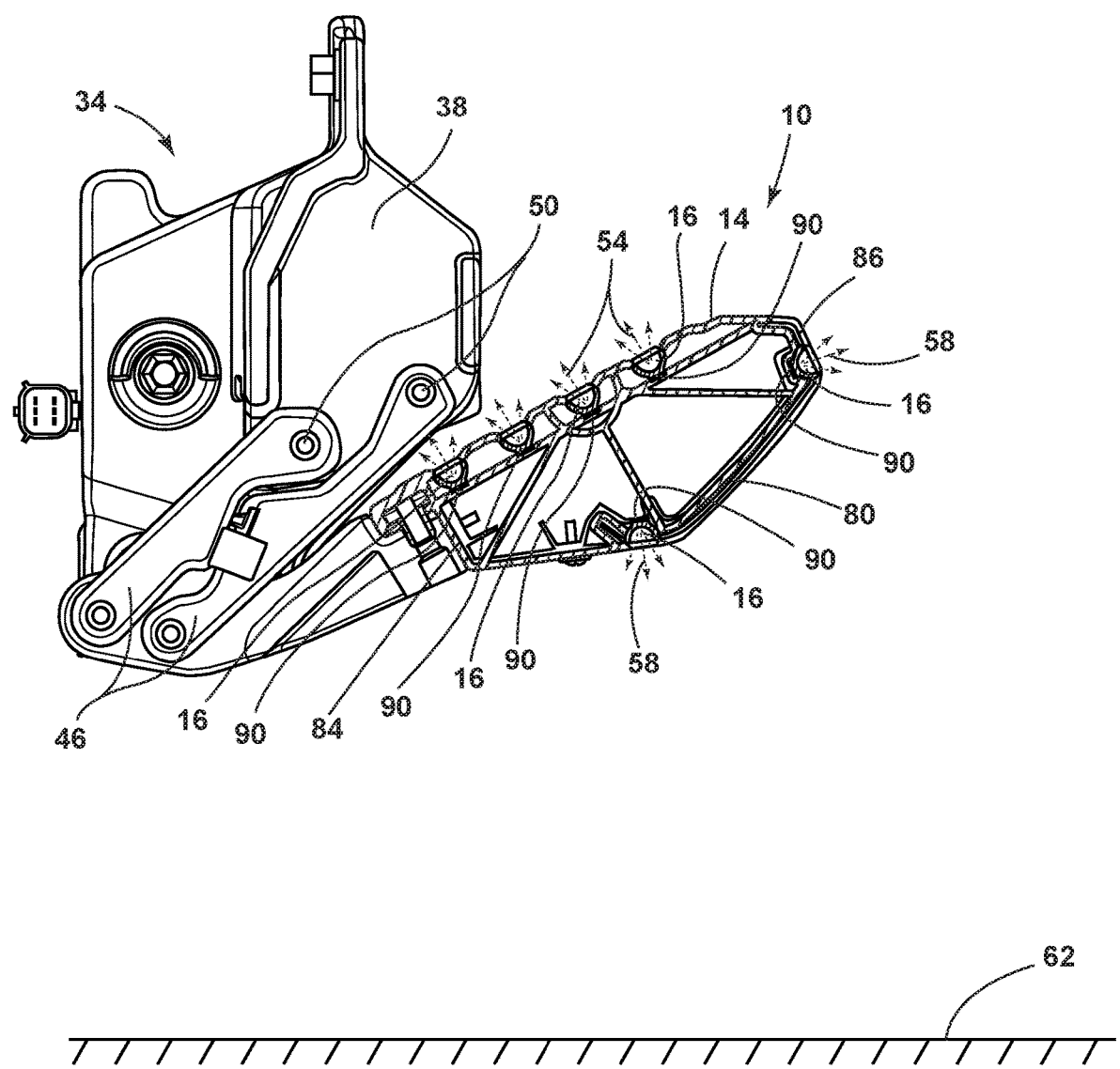
FIG. 4A is a cross-sectional view of the running board of FIG. 1 in a first position.
Figure 4B:
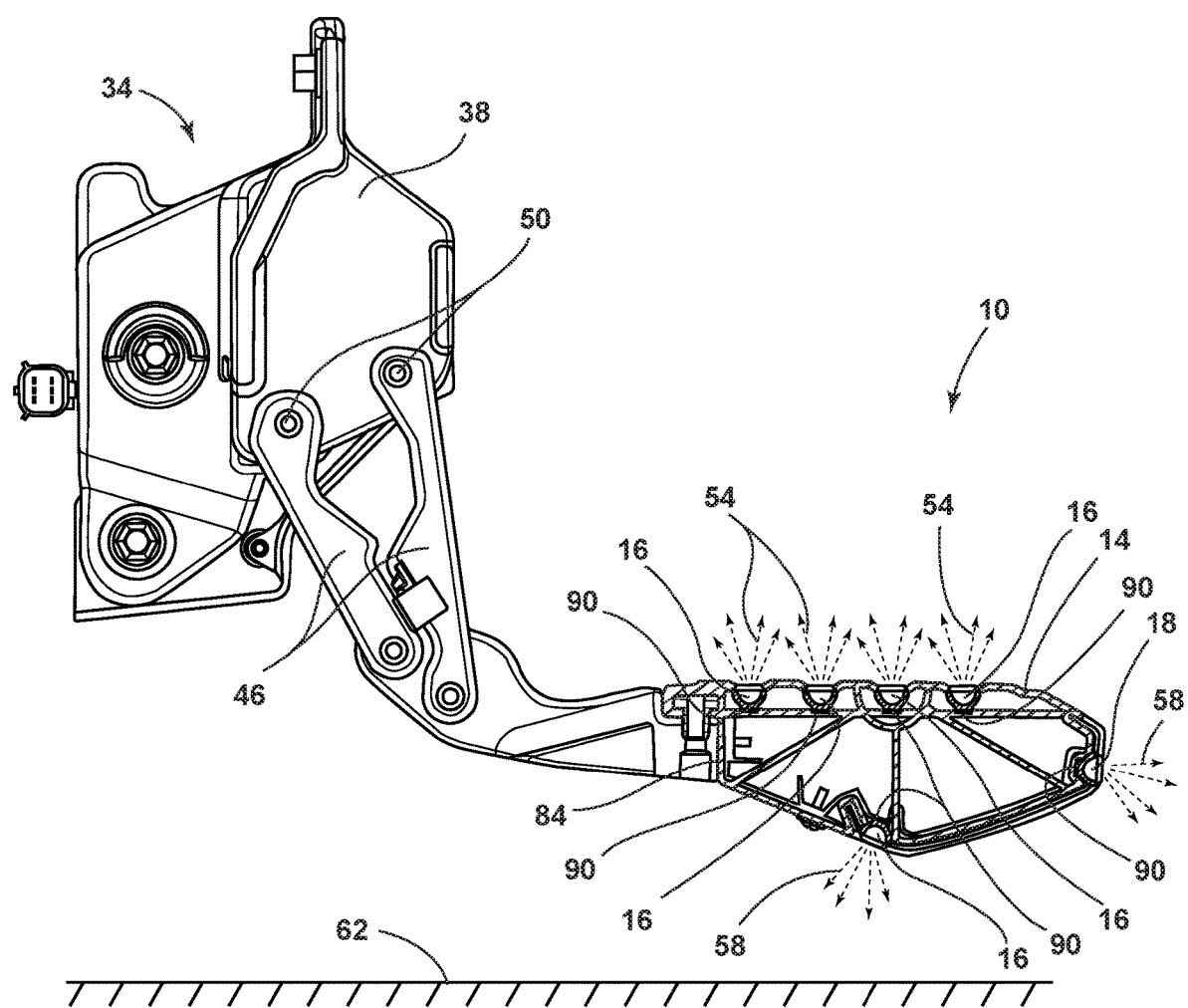
FIG. 4B is a cross-sectional view of the running board of FIG. 1 in a second position.

Referring now to FIGS. 4A and 4B, according to various examples, the running board 10 is operable between a stowed position (FIG. 4A) and a deployed position (FIG. 4B). In various examples, the stowed position (FIG. 4A) may be a first position and the deployed position (FIG. 4B) may be a second position. To facilitate movement between the first and second positions, the running board 10 may be coupled to a pair of linkages 46 that are each mounted to the vehicle frame 38 via a corresponding bracket 50. According to various examples, the linkages 46 may be configured to move the running board 10 between the stowed position and the deployed position. In other examples, the linkages 46 may be fixed to hold the running board 10 in an outward position (FIG. 4B). When the running board 10 is in the stowed position, the lighting assemblies 16 may still be operable, allowing the lighting assemblies 16 positioned on the second lateral side 86 to function as a side marker for the vehicle 34. According to various examples, when the running board 10 is in the deployed position, the lighting assembly 16 positioned on the second lateral side 86 may function as a decorative and functional light stripe. In other examples, the lighting assembly 16 positioned on the bottom plate 80 may function as extended puddle lamps along the vehicle 34. The lighting assembly 16 positioned on the bottom plate 80 may further function to illuminate the lighting pattern 66 when the running board 10 is in the stowed position. In still other examples, the lighting assembly 16 positioned on the second lateral wall 86 may function to illuminate the lighting pattern 66, as discussed above.

Referring now to FIG. 5, the lighting modules 120 of the lighting assemblies 16 are operably connected to the controller 140 using wiring leads 130. The lighting modules 120 may be controlled by a standalone controller or are otherwise integrated with an existing vehicle system. The controller 140 includes a memory 144 having instructions 148 stored thereon that are executable by a processor 152. The instructions 148 may generally relate to ways in which to operate the lighting modules 120 to affect the manner in which the lighting assemblies 16 illuminate. The controller 140 may also communicate with other vehicle devices such as, but not limited to, an ambient light sensor 160, a yaw sensor 164, a vehicle lighting control system 168, an audio system 172, a key fob sensor 176, a moisture sensor 180, and/or speedometer 184. By leveraging these vehicle devices, the lighting assemblies 16 may provide a variety of functional and/or aesthetic features and respond to user input for determining lighting pattern and color. While a few specific examples have been provided herein, it will be apparent to those of ordinary skill in the art that the lighting assemblies 16 may be used in conjunction with other devices without departing from the scope of the present disclosure.

Referring again to FIGS. 1-5, the plurality of lighting assemblies 16 may serve a variety of functions. According to various examples, the controller 140 may communicate with the ambient light sensor 160 to determine if the vehicle 34 is being operated at night or during the day. Alternatively, the ambient light sensor 160 may determine when the vehicle 34 is being operated in a dimly lit area (e.g., a parking garage). The controller 140 may be configured to instruct the laser diode 124 to illuminate when the ambient light sensor 160 indicates a first level (e.g., low light) of ambient light and to stop illuminating when the ambient light sensor 160 detects a second level of ambient light (e.g., above a predetermined luminance). The first level of ambient light may be lower than the second level of ambient light.

According to other examples, the controller 140 may communicate with the yaw sensor 164 to determine the vehicle's 34 angular velocity about its vertical axis. The controller 140 may instruct the laser diodes 124 to illuminate in a hazard pattern when the yaw sensor 164 detects the risk of roll-over or actual roll-over. The hazard pattern may alternate color or frequency depending on the orientation of the vehicle 34.

In still other examples, the controller 140 may further be in communication with the vehicle lighting control system 168, enabling a user to manually determine the color, frequency, or pattern produced by the laser diodes 124. The vehicle lighting control system 168 may be controlled by one of a remote, a cell phone, a display, a computer, etc. configured to be operated by the user. The vehicle lighting control system 168 may be wirelessly operated, allowing a user to control the lighting assemblies 16 from a predetermined distance.

According to various other examples, the controller 140 may communicate with the audio system 172 for the vehicle 34. The controller 140 may instruct the laser diodes 124 to pulse or illuminate to the beat of audio produced by the audio system 172. At least one of the frequency, brightness, color, and pattern of the illumination of the laser diodes 124 may be determined by the volume, beat, etc. of the audio from the audio system 172.

According to various examples, the controller 140 may communicate with the speedometer 184 to determine whether the vehicle 34 is in motion. The controller 140 may be configured to instruct the laser diode 124 to illuminate the lighting assemblies 16 with a first color (e.g., a red light) when the vehicle 34 is moving to indicate to users outside of the vehicle 34 not to approach. The controller 140 may then be configured to instruct the laser diode 124 to illuminate the lighting assemblies 16 with a second color (e.g., green light) when the vehicle 34 is stopped and accessible to users outside of the vehicle 34, allowing the running board 10 to indicate when to enter the vehicle 34.

In other examples, the laser diode 124 may be configured to produce white light and amber light. The controller 140 may communicate with the speedometer 184 to determine whether the vehicle 34 is in motion. When the vehicle 34 is stopped and the running board 10 is in the stowed position, the controller 140 may be configured to instruct the laser diode 124 to produce white light. When the vehicle 34 is in motion and the running board 10 is in the stowed position, the controller 140 may be configured to instruct the laser diode 124 to produce amber light. According to various examples, user input may be used to determine the color of the laser diode 124 where the laser diode 124 is an RGB diode. The emitted light 54, 58 may alternate between the amber (or alternate) colored light to the white light by fading from one color light to the other based on user input.

In still other examples, the lighting assemblies 16 may function as turning signals, providing a flashing amber colored light when the running board 10 is in the stowed position. The lighting assemblies 16 may also function as hazard lights. When the lighting assemblies 16 are used as hazard lights, the lighting assemblies 16 may flash at a frequency double that of the turn signal. According to various examples, the controller 140 may activate the hazard light frequency of the lighting assemblies 16 when one of the vehicle devices detects that the vehicle 34 has departed from a lane. The controller 140 may instruct the lighting assemblies 16 to flash a red-colored light when the vehicle 34 is in motion. When the vehicle 34 is in park, the running board 10 may be moved into the deployed position to increase visibility. In other examples, the lighting assemblies 16 may further alternate flashing red colored light and amber colored light at the hazard frequency.

According to various examples, the key fob sensor 176 may be configured to detect the proximity of the user. When the user approaches within a predetermined distance of the vehicle 34, the controller 140 may instruct the lighting assemblies 16 to flash white light or to display the lighting pattern 66 as a welcome indicator. The key fob sensor 176 may further be configured to detect when the user moves away from the vehicle 34. The controller 140 may then instruct the lighting assemblies 16 to flash white light or to display the lighting pattern 66 as a farewell indicator. It will be understood that the key fob sensor 176 may detect the user at a variety of distances, including, for example, 1 meter, 2 meters, 3 meters, 4 meters, 5 meters, or 6 meters, or any value or range therebetween without departing from the scope of the present disclosure.

In other examples, the controller 140 may be in communication with the moisture sensor 180 of the vehicle 34. When the moisture sensor 180 detects the presence of moisture on the exterior of the vehicle and/or in the air around the vehicle, the controller 140 may be configured to instruct the laser diodes 124 to illuminate to provide puddle lights for a lighting pattern 66 or to provide side markers for additional illumination of the vehicle 34 as the vehicle 34 travels in varying weather conditions.

Figure 6:
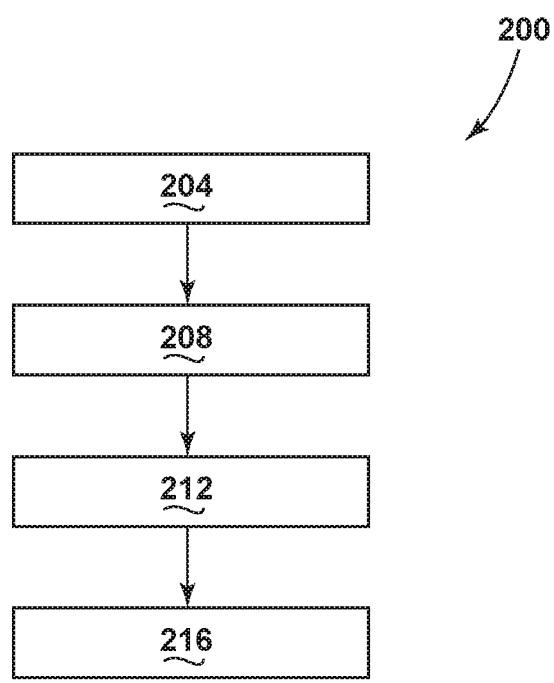
FIG. 6 is a flowchart of a method of manufacturing a running board.

Referring now to FIG. 6, a method 200 of manufacturing the running board 10 is provided including a step 204 of extruding the base layer 26 of the lighting assembly 16. As shown in the depicted example, the base layer 26 forms a portion of the running board 10. The base layer 26 may be any one of the top plate 14, the bottom plate 80, the first lateral side 84, or the second lateral side 86 of the running board 10. However, it is contemplated that the base layer 26 may be a separate structure from the running board 10.

The method 200 may further include a step 208 of extruding the clear lens layer 30 of the lighting assembly 16 of clarified polypropylene. The clear lens layer 30 is extruded to prevent gaps and seams in the coverage of the lighting assembly 16. Each of the clear lens layer 30 is positioned over the other pieces of the respective lighting assembly 16, forming a clear protective layer to prevent damage to or exposure of the light-diffusing waveguides 18

At least one light-diffusing fiber 18 including a plurality of scattering sites 104 is fed into the reflective layer 22 of the lighting assembly 16 in a step 212. The reflective layer 22 has a refractive index from about 2.0 to about 2.6. The reflective layer 22 may extend about 180 degrees around a portion of the light-diffusing waveguide 18. However, it is contemplated that the reflective layer 22 may be extruded to extend around a smaller portion of the light-diffusing waveguide 18 including, for example, 30 degrees, 60 degrees, 90 degrees, 120 degrees, 150 degrees, or any value or range therebetween.

According to various examples, the method 200 may be performed such that step 204 of extruding the base layer 26 of the lighting assembly 16, step 208 of extruding the clear lens layer 30 of the lighting assembly 16, and step 212 of extruding the light-diffusing fiber 18 into the reflective layer 22 of the lighting assembly 16 are all are all performed substantially simultaneously. The simultaneous extrusion provides a single piece for installation and increases the protection of the lighting assembly 16 from exterior elements, as discussed previously.

The method 200 may further include a step 216 of positioning the lighting module 120 at a first end of the lighting assembly 16. The lighting module 120 includes one of a single-color laser diode 124 and an RGB laser diode 124. The laser diode 124 may be positioned proximate the lens 128 and housed within the housing 126 of the lighting module 120. The laser diode 124 may be configured to illuminate the light-diffusing waveguide 18 as determined by the controller 140 (FIG. 5). It is contemplated that, although the steps are listed in a particular order, they may be performed in any order or with two or more steps being performed concurrently without departing from the scope of the present disclosure.

Use of the present disclosure may offer a variety of advantages. First, the running board 10 includes tri-extruded layers (the base layer 26, the reflective layer 22, and the clear lens layer 30). The tri-extrusion protects the lighting assemblies 16 from the elements by fully sealing the light-diffusing waveguide 18 between the reflective layer 22 and the clear lens layer 30. Further, the use of the light-diffusing waveguide 18 provides a consistent lit appearance over the lighting assembly 16 and prevents light gaps. Additionally, the lens layer 30 may be optical or light-diffusing. As discussed previously, the lighting assemblies 16 may exhibit various behaviors that can be tailored for both conventional and autonomous users. This provides additional customization for users and may provide indicators desirable for conventional and/or autonomous vehicles.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the disclosure as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A running board for a vehicle, comprising:
a bottom plate operably coupled to a top plate, each of the bottom plate and the top plate including a base layer;
a plurality of lighting assemblies coupled to the base layer of one of the top plate and the bottom plate, wherein each of the plurality of lighting assemblies comprises:
a reflective layer defining a channel; and
a light-diffusing waveguide positioned within the channel, the light-diffusing waveguide having a plurality of scattering sites; and
a lighting module optically coupled to each of the plurality of lighting assemblies, wherein each of the lighting modules includes a laser diode.

2. The running board of claim 1, wherein a portion of the plurality of lighting assemblies is positioned across the base layer of the top plate.

3. The running board of claim 1, wherein a portion of the plurality of lighting assemblies is positioned on the base layer of the bottom plate.

4. The running board of claim 1, wherein the running board top plate and the running board bottom plate are movable between first and second positions, and further wherein the lighting assemblies are configured to emit light in both the first and second positions.

5. The running board of claim 4, wherein the plurality of lighting assemblies is in a first state when the top plate and the bottom plate are in the first position, and further wherein the plurality of lighting assemblies is in a second state when the top plate and the bottom plate are in the second position.

6. A running board top plate comprising:
a plurality of light-diffusing waveguides;
a reflective layer positioned around a portion of each light-diffusing waveguide;
a base layer configured to receive one or more of the light-diffusing waveguides and the reflective layer; and
a clear lens layer positioned over the light-diffusing waveguides, the reflective layer, and the base layer.

7. The running board top plate of claim 6, wherein the base layer comprises fiber-filled polypropylene.

8. The running board top plate of claim 6, wherein the reflective layer comprises polypropylene and extends about 180 degrees around each of the light-diffusing waveguides.

9. The running board top plate of claim 8, wherein the polypropylene includes a pigment with a refractive index from about 2.0 to about 2.6.

10. The running board top plate of claim 6, wherein each of the reflective layers defines a channel and further wherein one of the plurality of light-diffusing waveguides is positioned within each of the channels.

11. The running board top plate of claim 6, wherein the lens layer comprises clarified polypropylene.

12. The running board top plate of claim 6, wherein a first end of each of the plurality of light-diffusing waveguides is optically coupled with a lighting module having a laser diode.

13. The running board top plate of claim 12, wherein the laser diode is one of a single-color laser diode and an RGB laser diode.

14. The running board top plate of claim 13, wherein the lighting module is configured to produce one of a plurality of colors of light based on movement of a vehicle.

15. The running board top plate of claim 13, wherein the lighting module is configured to produce one of a plurality of colors of light based on user input.

16. The running board top plate of claim 6, wherein each of the plurality of light-diffusing waveguides is a light-diffusing fiber, and further wherein each fiber has a plurality of scattering sites.

17. A method of manufacturing a running board comprising the steps of:

extruding a base layer of a lighting assembly, wherein the base layer forms a portion of the running board;

extruding a clear lens layer of the lighting assembly, wherein the clear lens layer comprises clarified polypropylene; and extruding a light-diffusing fiber into a reflective layer of the lighting assembly, wherein the light-diffusing fiber includes a plurality of scattering sites.

18. The method of manufacturing a running board of claim 17, wherein the steps of extruding a base layer of a lighting assembly, extruding a clear lens layer of the lighting assembly, and extruding a light-diffusing fiber into a reflective layer of the lighting assembly and the base layer are performed substantially simultaneously.

19. The method of manufacturing a running board of claim 17, further comprising the step of:

positioning a lighting module at a first end of the lighting assembly, wherein the lighting module includes one of a single-color laser diode and an RGB laser diode.

20. The method of manufacturing a running board of claim 17, wherein the reflective layer has a refractive index from about 2.0 to about 2.6.

* * * * *